United States Patent [19]

Dasgupta et al.

[11] Patent Number: 5,601,952
[45] Date of Patent: Feb. 11, 1997

[54] LITHIUM-MANGANESE OXIDE ELECTRODE FOR A RECHARGEABLE LITHIUM BATTERY

[76] Inventors: Sankar Dasgupta, c/o The Electrofuel Manufacturing Company Ltd. 21 Hanna Avenue, Toronto, Ontario, Canada, M6K 1W9; James K. Jacobs, 69 Albany Avenue, Toronto, Ontario, Canada

[21] Appl. No.: 448,768

[22] Filed: May 24, 1995

[51] Int. Cl.$^6$ ..................................... H07M 4/50
[52] U.S. Cl. ............................................ 429/224
[58] Field of Search .................... 429/224; 423/599, 423/605

[56] References Cited

U.S. PATENT DOCUMENTS

| | | | |
|---|---|---|---|
| 4,476,104 | 10/1984 | Mellors | 423/605 |
| 4,585,718 | 4/1986 | Uedaira et al. | 429/224 |
| 4,758,484 | 7/1988 | Furukawa et al. | 429/194 |
| 4,904,552 | 2/1990 | Furukawa et al. | 429/197 |
| 4,959,282 | 9/1990 | Dahn et al. | 423/605 X |
| 5,135,732 | 8/1992 | Barboux et al. | 423/593 |
| 5,211,933 | 5/1993 | Barboux et al. | 423/596 |
| 5,277,890 | 1/1994 | Wang et al. | 429/224 X |
| 5,294,499 | 3/1994 | Furukawa et al. | 429/164 |

FOREIGN PATENT DOCUMENTS

| | | | |
|---|---|---|---|
| 1331506 | 8/1994 | Canada | 319/37 |
| 2099504 | 10/1994 | Canada . | |

*Primary Examiner*—Stephen Kalafut

[57] ABSTRACT

The preparation of amorphous lithium-manganese oxide compound is described having lithium to manganese ratio between 0.4 and 1.5 and particle size less than 5 μm. The amorphous lithium-manganese oxide compound is to be utilized in a non-aqueous rechargeable lithium battery.

6 Claims, 1 Drawing Sheet

LITHIUM-MANGANESE OXIDE ELECTRODE FOR A RECHARGEABLE LITHIUM BATTERY

FIELD OF THE INVENTION

This invention is related to electro-chemical batteries, more particularly to lithium containing nonaqueous rechargeable batteries.

BACKGROUND TO THE INVENTION

Lithium batteries are known to generate energy by converting to electrical energy the chemical energy resulting in the formation of lithium compounds from lithium atoms. The reactions for the formation of the lithium compounds may be reversed by feeding electrical energy to a lithium battery, in other words, most lithium batteries may be readily recharged. In conventional non-aqueous lithium batteries, the anodic reaction comprises lithium, which is often intercalated in fine particles of carbon, being ionized to form a mobile lithium ion accompanied by the generation of an electron. In the recharging step of the anode or negative electrode, lithium atom is reformed by consuming an electron. The cathodic reaction in the discharging step of most lithium batteries entails the formation of a lithium compound by reacting lithium ions with a compound capable of incorporating lithium in its structure and simultaneously consuming electrons. Most frequently the reactant compound utilized in the cathode or positive electrode is a lithiated transition metal oxide. Conveniently, the transition metal oxide is a vanadium oxide homologue, such as $V_6O_{13}$, manganese dioxide, cobalt oxide, nickel oxide, tungsten dioxide and such like. In the recharging step of the cathode, lithium ions are released from the oxidic compound formed in the discharging reaction, simultaneously generating electrons.

The transition metal oxide for utilization as cathode active material in the positive electrode of a rechargeable lithium battery is required to be able to readily incorporate lithium ions in the discharging step and reversibly release the lithium ions in the charging step. Rechargeable lithium batteries utilizing lithium bearing manganese dioxide as the active component of the positive electrode are known, such batteries and methods for preparing crystalline lithium bearing manganese oxide utilized therein, are described for example, in U.S. Pat. No. 4,585,718 issued to S. Uedaira et al. on Apr. 29, 1986, and U.S. Pat. No. 4,758,485 issued to N. Furukawa et al. on Jul. 19, 1988. The preparation of lithium containing manganese oxide having particle size less than 20 µm and specific surface area in a certain desirable range, by heat-treatment at 375° C. of a mixture of fine dry lithium hydroxide and manganese dioxide, is described in U.S. Pat. No. 5,294,499, issued to N. Furukawa et al. on Mar. 15, 1994. Thackaray et al. in Canadian patent 1,331,506, issued on Aug. 23, 1994, teach the preparation of lithium deficient lithium-manganese oxide having the general formula $Li_{1-x}Mn_2O_4$, where x has a value which is greater than zero but less than one, and the subsequent heat-treatment of the mixed oxides at temperatures higher than 200° C. The lithium-manganese oxide obtained in accordance with Thackaray et al. has a spinel-type crystal structure. The preparation of spinel-type small particle size $Li_{1-x}Mn_2O_4$, where the value of x ranges between zero and one, from organic precursors at temperatures higher than 300° C. and their performance in a lithium battery, are described in U.S. Pat. No. 5,135,732, issued to Barboux et al. on Apr. 23, 1991. It is noted that the lithium-manganese dioxide compound obtained by any of the methods described in the publications referred to hereinabove, was fully crystalline which was indicated in the referred publications by X-ray diffraction identification of characteristic peaks.

It has been observed that while the expected open circuit voltage of a lithium battery can be attained after repeated charge-discharge cycles of a transition metal oxide bearing lithium battery, the energy density obtained may often diminish in the repeated cycling of such lithium batteries. It is the object of this invention to provide a new form of lithium-manganese oxide containing positive electrode for utilization in a non-aqueous rechargeable lithium battery, which is capable of maintaining high energy density in repeated charging-recharging cycles.

SUMMARY OF THE INVENTION

In accordance with the present invention a substantially amorphous lithium-manganese oxide compound is provided that contains lithium and manganese such that the atomic ratio of Li:Mn falls between 0.4–1.5 and the crystalline component within the lithium-manganese oxide compound is less than 10 vol. %. The particle size of the amorphous lithium-manganese oxide is less than 5 µm. The amorphous lithium-manganese oxide compound is utilized as the cathode active material in the positive electrode of a rechargeable lithium battery. The positive electrode may also contain fine carbon particles intermixed with the amorphous lithium-manganese oxide compound particles.

Figure 1:
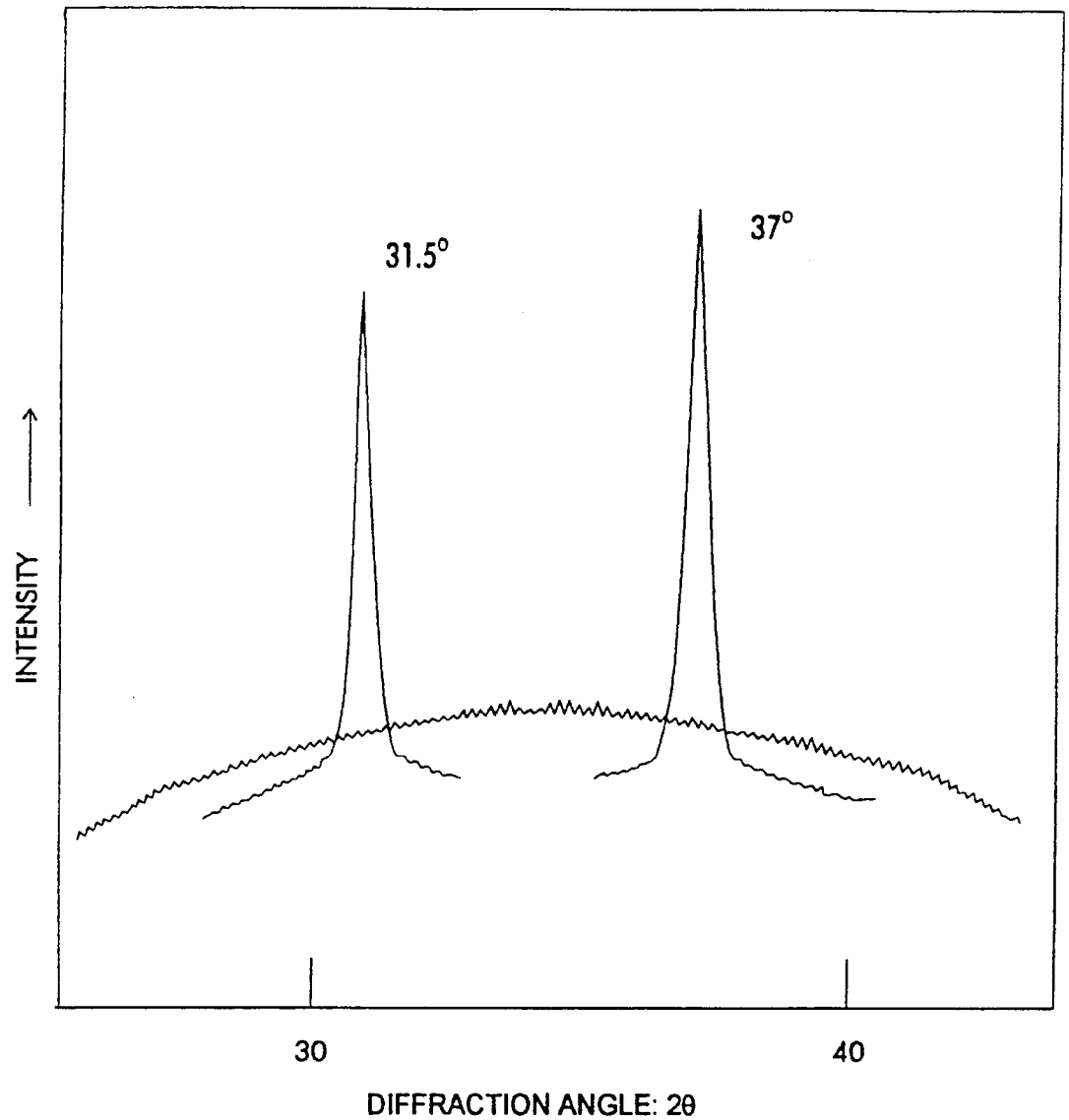
FIG. 1 is a section of an X-ray diffractogram showing the diffraction pattern of the amorphous lithium-manganese oxide compound of the present invention, together with characteristic diffraction peaks of crystalline manganese dioxide and crystalline lithium-manganese oxide.

The preferred embodiment of the present invention will now be described illustrated by the figures and working examples.

DETAILED DISCUSSION OF THE PREFERRED EMBODIMENT

As briefly discussed above, the availability of the energy resulting from the reaction between the lithium ion and the manganese oxide within the positive electrode, as well as the ease with which the lithium ion enters into such reaction, will greatly influence the rechargeability of the lithium battery based on the particular reaction. In accordance with this comment, it was noted that the particle size, the crystal structure and composition of the lithium-manganese oxide compound utilized positive electrode in conventional lithium batteries, have significant effect on the rechargeability and energy density of the lithium battery. It has now been found that amorphous lithium-manganese oxide that has not been heat-treated above 120° C. subsequent to compound formation, when utilized as cathode active substance in the positive electrode, provides a lithium battery having consistently higher energy density than most conventional lithium-manganese oxide compound containing batteries.

The amorphous lithium-manganese oxide compound utilized in the positive electrode of the lithium battery may be produced by conventional sol-gel techniques. The usual reagents utilized in the sol-gel preparation is a lithium alkoxide, such as lithium butoxide or lithium propoxide, or it may be a chemical equivalent, that is reacted with a manganese acetate or a similar manganese compound of a short chained carboxylic acid. Alternatively, the manganese compound may also be an alkoxide, or a chemical equivalent that can react with the lithium containing reagent to form a lithium-manganese oxide in a water-miscible organic solvent. The organic solvent is often an alcohol, which usually also contains ammonia or a similar organic base. It is usual that the reaction is conducted at a pH about 7–8, but the sol-gel preparation of the lithium-manganese oxide compound may be carried out in an acidic medium as well. The reaction is conducted at controlled temperature, preferably below 100° C., with vigorous stirring until the viscosity of the solution increases substantially, which is an indication of gel formation. The obtained gel is subsequently allowed to age at a temperature not exceeding 80° C., for a prolonged period which may be 20 hours or it may extend to several days, dictated by the nature of the compound formed. The lithium-manganese oxide gel is then dried, that is the liquid in the gel is removed. Depending on the method of liquid removal a xerogel, aerogel, sonogel or cryogel is obtained. Any other method of solvent removal may be used, however, for best results the temperature during the drying process should not exceed 120° C., preferably it should be below 100° C.

The lithium-manganese oxide compound so obtained has very fine particle size, and is suitable for utilization as cathode active substance in the positive electrode of a conventional rechargeable lithium battery. The lithium-manganese oxide particles may be mixed with fine carbon to increase the conductivity of the electrode. The fine carbon may be acetylene black, petroleum coke or similar high purity carbon of particle size less than 1 μm. The lithium-manganese oxide with or without carbon admixed, may be pelletized for utilization in button-type lithium batteries, or formed into a layer or coating, to be incorporated in a planar or thin film battery of a desired shape or size.

The lithium-manganese oxide compound formed by the sol-gel method but without heat-treatment above 120° C. has been found to be amorphous or non-crystalline. The presence of lithium and manganese in the lithium-manganese oxide obtained can be shown by known analytical methods, however, the chemical formula of the lithium-manganese oxide can not be determined by usual relatively simple techniques for obvious reasons. It is believed that the lithium is chemically bonded to the manganese oxide precipitated by the sol-gel method, as well as a portion of the lithium may also be quasi-chemically adsorbed on the surface of the submicroscopic manganese oxide particles.

It is well known that the X-ray diffraction pattern of a crystalline substance yields peaks at certain angles, that is at d-values, which are characteristic of the crystal structure of the particular crystalline substance. It is also noted that when the crystalline particles are of submicroscopic size, the characteristic peaks will exhibit substantial broadening at the base of the peak, this phenomenon is known as "line broadening". It is to be emphasized, however, that the breadth or width of the characteristic peak is not known to exceed the height of the characteristic peak of a crystalline substance. One of the noted and listed characteristic diffraction peaks of manganese dioxide is at 31.5° (CuKα radiation), similarly, one of the characteristic diffraction peaks of $Li_{1-x}Mn_2O_2$ is close to 37°, but some shift in the value of this diffraction angle can be expected due to variations in the lithium content of the lithium-manganese oxide compound.

The amorphous nature of the lithium-manganese oxide compound obtained by the sol-gel method in the absence of heat treatment above 120° C., was demonstrated by the X-ray diffraction pattern of this substance, wherein no peak could be seen in the 30°–40° range, only a very broad and shallow "hump". The width of the "hump" was more than double its height, in fact, the width to height ratio was close to 3. For the sake of consistency of expression, the "hump" observed will be referred to as peak in the discussion hereinbelow. A portion of the X-ray diffraction pattern of the amorphous lithium-manganese oxide is shown schematically on FIG. 1, together with superimposed peaks at 31.5° of crystalline $MnO_2$ and at 37° of crystalline $Li_xMn_2O_4$ where $0.5<x<2$, respectively. The peaks of crystalline manganese dioxide and crystalline $Li_xMn_2O_4$ are shown merely for comparison.

As stated above, it was found that a lithium battery having amorphous lithium-manganese oxide compound as cathode active material, exhibits higher energy density in repeated cycling then most conventional lithium-manganese oxide compound containing batteries. It is suggested by way of explanation, however the explanation is not considered binding, that the ionic mobility of lithium ions, hence the conductivity, in an amorphous compound may be of a higher value than in the corresponding crystalline compound. Moreover, the higher specific surface of the small amorphous particles obtained in the absence of high temperature treatment, may adsorb more lithium ions and thus permit movement of lithium ions in and out of a manganese oxide compound more readily than a crystalline manganese oxide compound.

EXAMPLE

Manganese acetate and lithium butoxide made by conventional methods were reacted in a medium of ethyl alcohol and aqueous ammonium hydroxide. The ratio of lithium to manganese in the reagents was 6:10. The temperature of the solution was kept at 78° C. and was vigorously stirred until a notable increase in the solution viscosity was observed. The obtained gel was aged at 80° C. for 3 days. The aged gel was mixed with acetone and was subsequently dried by means of conventional supercritical carbon dioxide treatment.

The obtained aerogel containing lithium-manganese oxide in which the lithium to manganese atomic ratio was 5.2:10, had particle size less than 1 μm. The lithium-manganese oxide aerogel was mixed with 6 vol. % acetylene black and 5 vol. % polyvinylidene fluoride as binder. The mixture so obtained was coated onto a conventional metallic current collector to form a 0.8 mm thick, continuous layer by the doctor's blade method, to be utilized as positive electrode in a lithium battery. The electrolyte and separator of the lithium battery was a microporous polyethylene laminate marketed under the name of "Cellgard" which has been impregnated with an ethylene-propylene carbonate solution containing $LiClO_4$ in 1 Molar concentration. The negative electrode was elemental lithium intercalated in carbon in a known manner. A lithium battery was assembled of the above positive and negative electrodes and the electrolyte-separator located between the electrodes. The lithium battery was fully charged at 4.2 volts and then discharged. The open circuit voltage was found to be 3.2 volts. The energy density provided by the lithium battery having amorphous lithium-manganese oxide bearing positive electrode was found to be 221 Whr/l after 28 cycles.

It has been found that other amorphous lithium-transition metal oxide compounds, such as lithium-cobalt oxide, can also be obtained by the present sol-gel method wherein the process step temperatures are maintained below 120° C. A lithium battery utilizing amorphous lithium-cobalt oxide as cathode active material in its positive electrode was found to perform well, providing high energy density after repeated cycling.

Although the present invention has been described with reference to the preferred embodiments, it is to be understood that modifications and variations may be resorted to without departing from the spirit and scope of the invention, as those skilled in the art will readily understand. Such modifications and variations are considered to be within the purview and scope of the invention and the appended claims.

We claim:

1. An amorphous lithium-manganese oxide compound for incorporation in the positive electrode of a rechargeable lithium battery comprising lithium oxide and manganese dioxide as a chemical compound containing lithium and manganese such that the atomic ratio Li:Mn has a value between 0.4–1.5, said lithium manganese oxide compound having average particle size less than 5 μm.

2. An amorphous lithium-manganese oxide compound for incorporation in the positive electrode of a rechargeable lithium battery as claimed in claim 1, additionally comprising particles of fine carbon intermixed with said amorphous lithium-manganese oxide compound in less than 12 vol %.

3. An amorphous lithium-manganese oxide compound for incorporation in the positive electrode of a rechargeable lithium battery as claimed in claim 1, wherein the width of the characteristic X-ray diffraction peak of said lithium-manganese oxide compound is greater than twice the height of said characteristic X-ray diffraction peak.

4. An amorphous lithium-manganese oxide compound for incorporation in the positive electrode of a rechargeable lithium battery as claimed in claim 1, containing less than 10 vol. % crystalline lithium-manganese oxide compound formed in the course of preparation of said amorphous lithium-manganese oxide compound.

5. A rechargeable non-aqueous lithium battery comprising:

i) a battery housing;

ii) a negative electrode comprising elemental lithium;

iii) a lithium ion containing non-aqueous electrolyte, selected from the group consisting of: a lithium ion containing solid polymer laminate, a microporous polymer laminate impregnated with a lithium ion containing organic liquid and particles of a lithium ion containing solid polymer;

iv) a positive electrode comprising particles of an amorphous lithium-manganese oxide compound containing lithium and manganese such that the atomic ratio Li:Mn is greater than 0.4 in the charged state of said rechargeable non-aqueous lithium battery and said atomic ratio is less than 1.5 in the discharged state of said rechargeable non-aqueous lithium battery, said amorphous lithium-manganese oxide compound having average particle size less than 5 μm; and v) a pair of charge collector means, one of said pair of charge collector means being in contact with said negative electrode and the other of said charge collector means being in contact with said positive electrode.

6. A rechargeable non-aqueous lithium battery as claimed in claim 5, wherein said positive electrode further comprises particles of fine carbon intermixed with said particles of amorphous lithium-manganese oxide compound in less than 12 vol %.

* * * * *